United States Patent [19]
Martin

[11] Patent Number: 6,125,744
[45] Date of Patent: Oct. 3, 2000

[54] FRUIT PEELER

[75] Inventor: Richard Martin, Champaign, Ill.

[73] Assignee: Pre-Pack Machinery, Inc., Champaign, Ill.

[21] Appl. No.: 09/378,930

[22] Filed: Aug. 23, 1999

[51] Int. Cl.[7] .................................................. A23N 7/00
[52] U.S. Cl. .............................. 99/590; 99/541; 99/591; 99/593; 99/594; 99/595; 99/596
[58] Field of Search .............................. 99/537–541, 584, 99/588–599, 623; 426/481–483

[56] References Cited

U.S. PATENT DOCUMENTS

| | | | |
|---|---|---|---|
| 3,744,408 | 7/1973 | Palis ........................................ | 99/595 X |
| 4,741,265 | 5/1988 | Cushman . | |
| 4,771,682 | 9/1988 | Ishikawa . | |
| 4,972,769 | 11/1990 | Caillot . | |
| 5,027,699 | 7/1991 | Paterson et al. . | |
| 5,097,758 | 3/1992 | Fresh ........................................ | 99/590 |
| 5,105,735 | 4/1992 | Gonzalvo ................................. | 99/590 |
| 5,133,250 | 7/1992 | Del Ser Gonzalez ................ | 99/541 X |
| 5,660,104 | 8/1997 | Heinzen . | |
| 5,690,022 | 11/1997 | Chai . | |
| 5,806,414 | 9/1998 | Heinzen . | |

*Primary Examiner*—Timothy Simone
*Attorney, Agent, or Firm*—Berns Law Office, P.C.

[57] ABSTRACT

A peeling machine is disclosed for peeling various fruits and vegetables. The peeling machine includes a lower holding assembly and an upper holding assembly rotatably coupled to a frame for securing and rotating a fruit or vegetable to be peeled. An air cylinder acts to push the lower assembly towards the upper holding assembly, in the process securing the fruit or vegetable between the upper and lower holding assemblies. A carriage assembly, which is configured to move vertically, is movably coupled to the frame, the carriage assembly containing a cutting assembly coupled to the end of a second air cylinder. The extension of the second air cylinder acts to push the cutting assembly towards the fruit as the carriage assembly moves upwards, as a result peeling the rind from the fruit or vegetable.

5 Claims, 4 Drawing Sheets

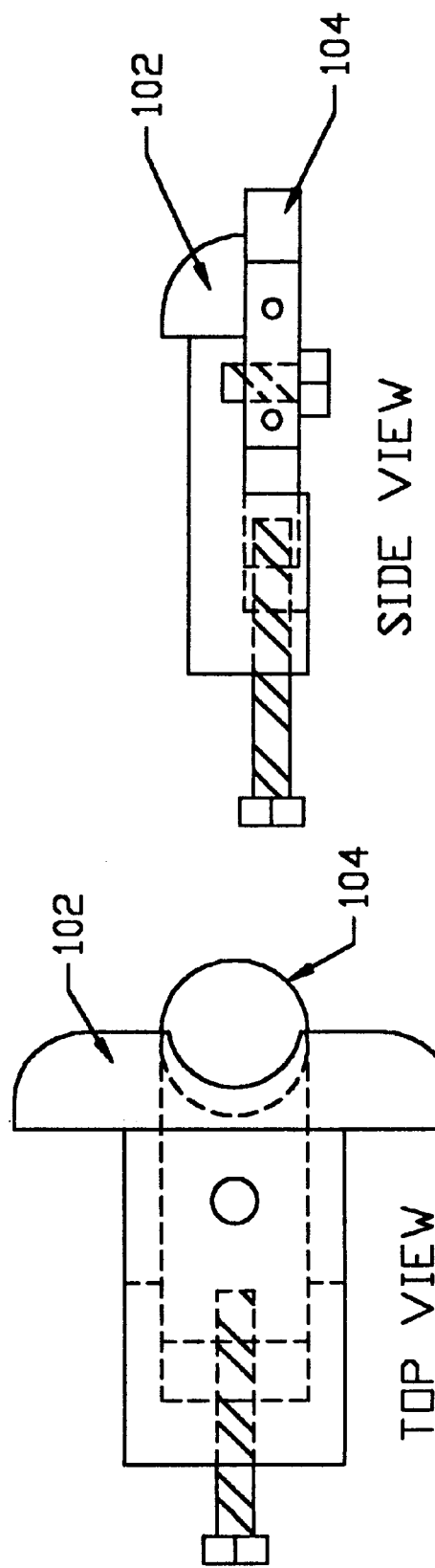

FRUIT PEELER

FIELD OF THE INVENTION

This invention relates to an apparatus for peeling fruits and vegetables. Primarily, the invention has been designed for peeling honey dew melons, cantaloupe, watermelon, and pineapple.

DESCRIPTION OF THE PRIOR ART

It is well known in the art of peeling machines to employ a machine having two opposing ends that secure and rotate an average-sized, spheroid fruit or vegetable. While the fruit is being secured, a peeler would peel the rind (and invariably some flesh) from the fruit or vegetable. None of these prior art peelers have been able to quickly, efficiently, and with minimum input from an operator, peel widely diverse fruits and vegetables, especially those with irregular shapes. U.S. Pat. No. 5,806,414, to Heinzen, discloses a peeling machine which contains mandrels in a carriage assembly. The mandrels hold and rotate a spheroidal fruit or vegetable while two opposingly positioned knife members, aligned with either side of the fruit or vegetable, cut the rind along the equator of the fruit. While the fruit continues to rotate, and the knife members continue to cut the rind of the fruit, the entire carriage assembly proceeds to rotate to a second position, allowing the fruit to rotate about a second axis. This allows the knife members to cut a majority of the rind of the fruit. This machine, while automated, is directed only to spheroidal fruits and vegetables.

U.S. Pat. No. 4,771,682, to Ishikawa, is directed to a disclosure of a peeling machine which includes a rotary clamp mechanism having a pair of clamps which grip and rotate a fruit or vegetable while a rotating cup-shaped cutting blade is moved along the profile of the fruit or vegetable. The peeling machine employs a blade support which is adjustably mounted on a support arm which is rotatable about a shaft for traverse movement of the support arm. The blade support is adjustable for various radii of blade rotation. This machine is adaptable to some varied fruit sizes or shapes, particularly citrus fruits, but the operator must perform the adaptations manually. U.S. Pat. No. 5,690,022, to Chai, discloses a peeling device having a base which houses a motor. The motor controls the rotation of a fruit between two opposing end clamps, and the motor rotates a screw along which a movable cutting member travels. A knife is pivotally connected to the movable cutting member, and the knife is urged towards the fruit by a spring. This device also requires sufficient work by the operator, which makes the prior art device less efficient for industrial use than the present invention.

There is a need in the art for a peeling machine that is capable of adjusting automatically, without excess work by the operator, to fruit and vegetables of diverse height, shape, and depth of rind while providing consistent cutting depth. There is a further need in the art for a peeling machine that is simple to operate and that peels quickly. There is a need in the art for a peeling machine which can be operated by an operator simultaneously with the operation of a second or third peeler by the same operator. There is need in the art for a peeling machine that requires low maintenance, and for a machine that is easily repairable.

SUMMARY OF THE INVENTION

The present invention includes a stainless steel ring for receiving and supporting spheroidal fruits and vegetables. Once the fruit/vegetable is in position, the operator presses a treadle air valve and an air cylinder, centered directly below the fruit, extends to engage the fruit. A stainless steel disk with small barbs is mounted on a bearing assembly In one form of the present invention, a peeling machine for peeling fruit and vegetables is provided which comprises a frame; a means for rotating the fruit, the means for rotating the fruit comprising upper and lower gripping assemblies, an air cylinder for pushing the lower gripping assembly towards the upper gripping assembly, and means for rotating the upper gripping assembly; a carriage assembly which is movably coupled to the frame; an air cylinder which is coupled to the carriage assembly; a cutting assembly which is coupled to the carriage assembly and configured such that extension of the air cylinder will push the cutting assembly towards the fruit or vegetable to be peeled; and a means for moving the carriage assembly up and down.

By providing an upper and lower holding assembly which is pushed together by an air cylinder, the peeling machine can automatically secure fruit or vegetables of varying heights between the holding assemblies, while rotating the fruit for peeling. The movable carriage assembly will then move upward. The air cylinder pushes a cutting assembly towards the fruit. The use of an air cylinder allows consistent cutting depth of the cutting assembly. The cutting head is configured to swivel and move along the profile of the fruit or vegetable as the carriage assembly rises, and yet maintain a desired compression, and consistent cutting depth, against the fruit or vegetable by the air cylinder. The cutting head preferably will contain an curved cutting blade that is adjustable for varying cutting depths. In one form of the invention, sensors will operate to stop the upward or downward movement of the carriage assembly as the carriage assembly moves the cutting assembly. This peeling machine is configured such that the compression of the fruit between the holding assemblies, the speed of the rotation of the fruit or vegetable, the torque, the braking of the peeling machine can all be controlled electronically through the use of inverters. This machine is easily adaptable to various rind depths, and is automatically adjustable to various fruit and vegetable heights and shapes. The machine is designed for low maintenance, including easy replacement of the cutting blade. The machine is simple enough to use and efficient enough in the machine operation so that one operator could efficiently operate three of such peeling machines at once.

Other objects, advantages, and novel features of the invention will become apparent from the following detailed description and appended claims, when taken in conjunction with the accompanying drawings.

BRIEF DESCRIPTION OF THE DRAWINGS

FIG. 3 is an illustration of a cutting head assembly in accordance with the present invention.

REFERENCE NUMERALS IN THE DRAWINGS

Figure 1:
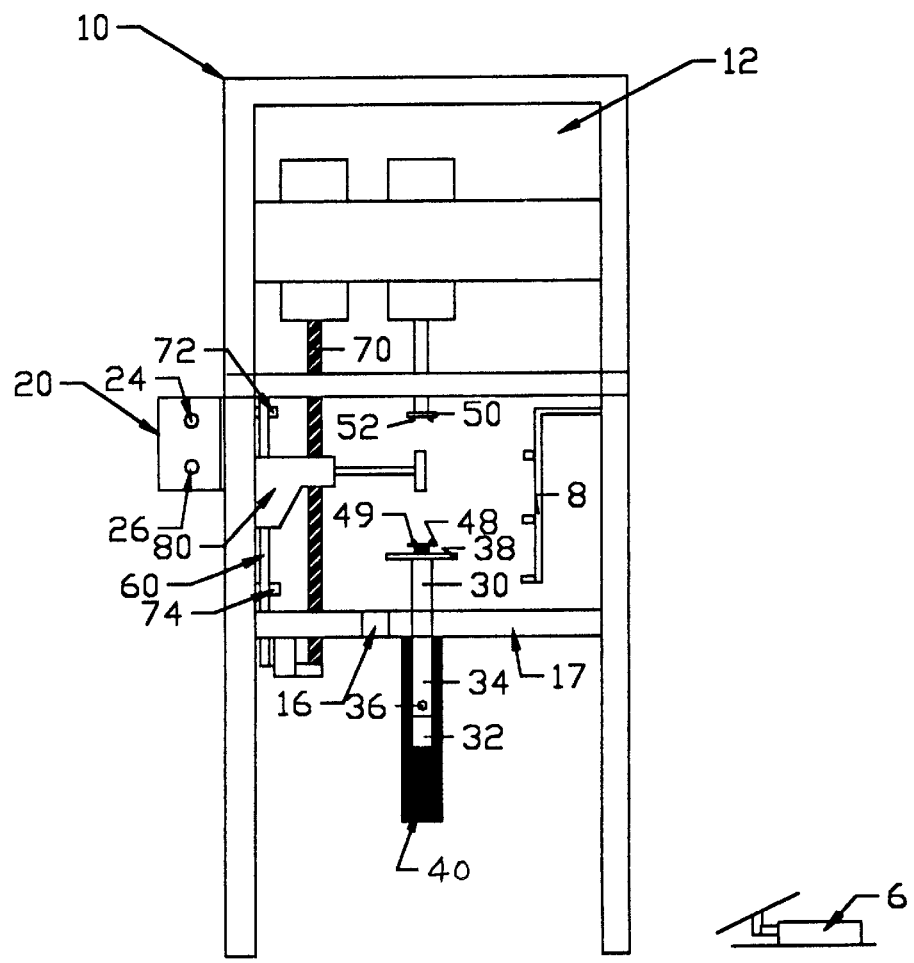
FIG. 1 is a front view of the fruit peeler in accordance with the present invention.

8. Water sprayer
10. Support frame
12. Bin
14. Bin

16. First Beam
17. Second Beam
18. Third Beam
20. Switch Panel
22. Switch Panel
24. Switch
26. Switch
30. Ring support
32. Fixed column
34. Adjustable column
36. Tightening means
38. Ring
40. Bottom air cylinder
42. Bearing assembly
44. Rod
46. Cylinder housing
48. Lower disk assembly
50. Upper disk assembly
52. Barb
60. Shaft
62. Pillow block bearing
70. Threaded rod
72. Upper proximity sensor
74. Lower proximity sensor
80. Carriage assembly
82. Arn assembly
84. T-shaped section
86. Vertical component of the T-shaped section
88. Horizontal component of the T-shaped section
90. Cylinder holder
94. Extension rod
100. Cutting head assembly
102. Top section of cutting head assembly
104. Razor blade

DETAILED DESCRIPTION OF THE PREFERRED EMBODIMENT

FIG. 1 is a front view of the fruit peeler in accordance with the present invention. In this description, "fruit" will serve to indicate either a fruit or a vegetable. The fruit peeler comprises a support frame 10 constructed of a sturdy material, such as stainless steel or a similar commercial grade metal. The support frame 10 includes a plurality of legs, preferably four in a square pattern for stability of the fruit peeler and for allowing a fruit to be introduced and peeled within the volume of the frame. A first beam 16 is located on one side of the fruit peeler, connecting the back end and the front end of the fruit peeler. Second and third beams 17, 18 are located on the front and back ends, respectively, of the fruit peeler, extending from and connecting the left end and the right end of the peeler for stability of the support frame. Bins 12 and 14 are contained both at the top of and behind the frame 10, respectively, within an upper section of the fruit peeler. The bins 12 and 14 are configured to house the motors, electronics, and other means for powering and controlling the fruit peeler. The bins 12 and 14 are constructed of a sturdy material, such as stainless steel. Operatively coupled to the frame are switch panels 20, 22 which contain switches 24, 26 for operating the fruit peeler. A water sprayer 8, preferably operated by a solenoid air valve, operates to spray the fruit with a mist as the fruit is being peeled.

A crossbeam 16 for holding a ring support 30 extends along an approximately central axis of the fruit peeler, connecting the front and back ends of the frame 10. The ring support 30, which holds a ring 38, is coupled to the upwardly facing surface of the crossbeam, near the front end of the crossbeam. The ring support 30 comprises a fixed column 32 which is fixedly mounted to the crossbeam 16, and an adjustable column 34 which is slidingly fitted to the fixed column 32 for adjusting the height of the ring 38. The adjustable column 34 is configured to be adjustably secured to the fixed column 32 through the use of any means for tightening the adjustable column 36, the means being coupled to the adjustable column 34. The ring 38 is mounted to the adjustable column 34 for holding fruit awaiting peeling by the fruit peeler. The ring 38 contains a ring opening 39 for allowing a cutting unit to pass through the ring opening unimpeded by the ring. The height of the ring 38 can be adjusted by sliding the adjustable column 34 along the fixed column 32 and fixing the adjustable column 34 at the desired height by employing the means for tightening the adjustable column 36.

Centered directly below the ring 38 is a bottom air cylinder assembly 40 for moving the fruit into position to be rotated and peeled. The top section of the bottom air cylinder assembly comprises a bearing assembly 42, which is mounted to a rod 44, the rod being housed within a cylinder housing 46 when the rod of the bottom air cylinder assembly is not extended. The rod 44 of the bottom air cylinder assembly is configured to extend vertically when activated, pushing the bearing assembly 42 in an upward direction for contact and engagement with the fruit. This pushes the fruit upward, preferably above the ring, until contact with, and desired compression by, an upper disk assembly 50. The other end of the bottom air cylinder assembly is pneumatically and operatively connected to an actuating member (not shown) within the rear bin 14. The actuating member is operated by an operator in the preferred embodiment through the use of a treadle air valve 6 located on the ground below the fruit peeler. A lower disk assembly 48 is coupled to the top of the bearing assembly 42 of the bottom air cylinder 40. The lower disk assembly 48 is fitted with a plurality of barbs 49 that are configured to contact the fruit as the fruit is pushed upwardly, piercing the rind of the fruit and securing the fruit on the lower disk assembly in order to prevent the fruit from undesirably detaching from the lower disk assembly 48. The bottom air cylinder assembly is configured such that when the rod of the bottom air cylinder assembly pushes the fruit against the upper disk assembly, the rod will stop its extension, with the lower disk assembly and upper disk assembly holding the fruit in place. Centered directly above the ring 38 is an upper disk assembly 50. The upper disk assembly 50 is fitted with barbs 52 extending downward from the upper disk assembly. The barbs 52 are configured to contact the fruit, piercing the rind of the fruit and securing the fruit on the upper disk assembly to prevent the fruit from undesirably detaching from the upper disk assembly 50 when the fruit and the upper disk assembly are in contact. The upper disk assembly 50 is coupled to a motor (not shown) for rotating the upper disk assembly, preferably in a clockwise direction, thus rotating the lower disk assembly and the fruit therebetween, causing the fruit to rotate about a substantially central vertical axis of the fruit. In the preferred embodiment, the motor employed is a ¾ horsepower inverter duty three phase motor, which is driven by an inverter. The upper disk assembly is coupled to the motor by an OMEGA disk flex element.

The ring 38, lower disk assembly 48, bottom air cylinder assembly 40, and upper disk assembly 50 are configured to work in combination to lift and secure the fruit for peeling. This design is advantageous because the action of the bottom air cylinder assembly is adaptable to varying heights of fruits or vegetables. The preferred embodiment allows for the automatic adjustment of the fruit peeler for fruits for fruits ranging from 5" to 14" tall. When activated by the operator by, for example, the pressing of a starting switch 24 on the switch panel 20, the motor operates to rotate the upper disk assembly and thus rotate the fruit. This design is also advantageous because it allows the operator to secure and rotate the fruit that is to be peeled by simply placing the fruit onto the ring, pressing the treadle air valve, and then pressing the start button. In the preferred embodiment, the speed, torque, and braking of the motor are controlled electronically through the inverters. The pressing of the starting switch also acts, in the preferred embodiment, to operate the water sprayer 8.

Figure 2:
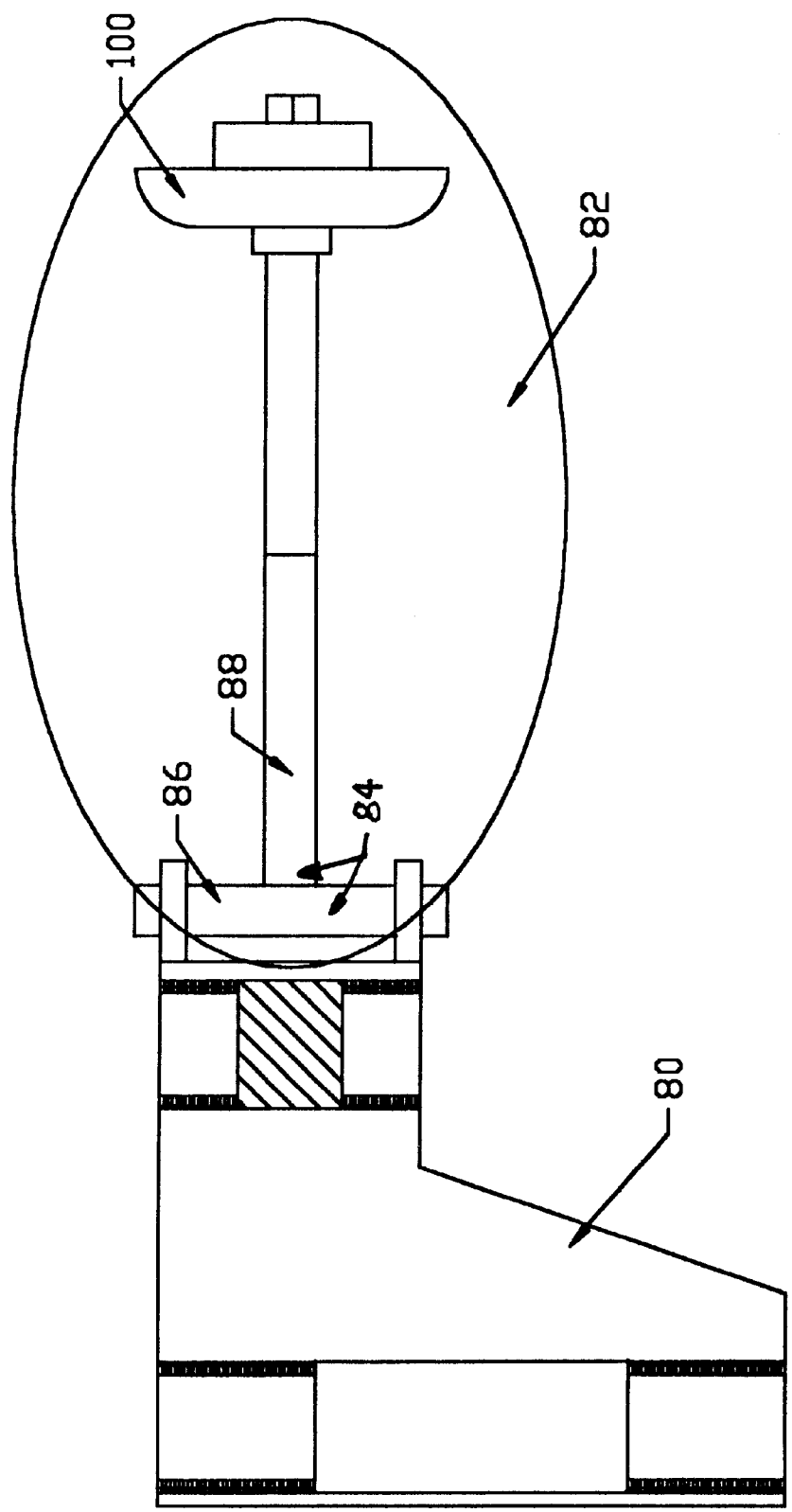
FIG. 2 is an illustration of a carriage assembly in accordance with the present invention.
Figure 2A:
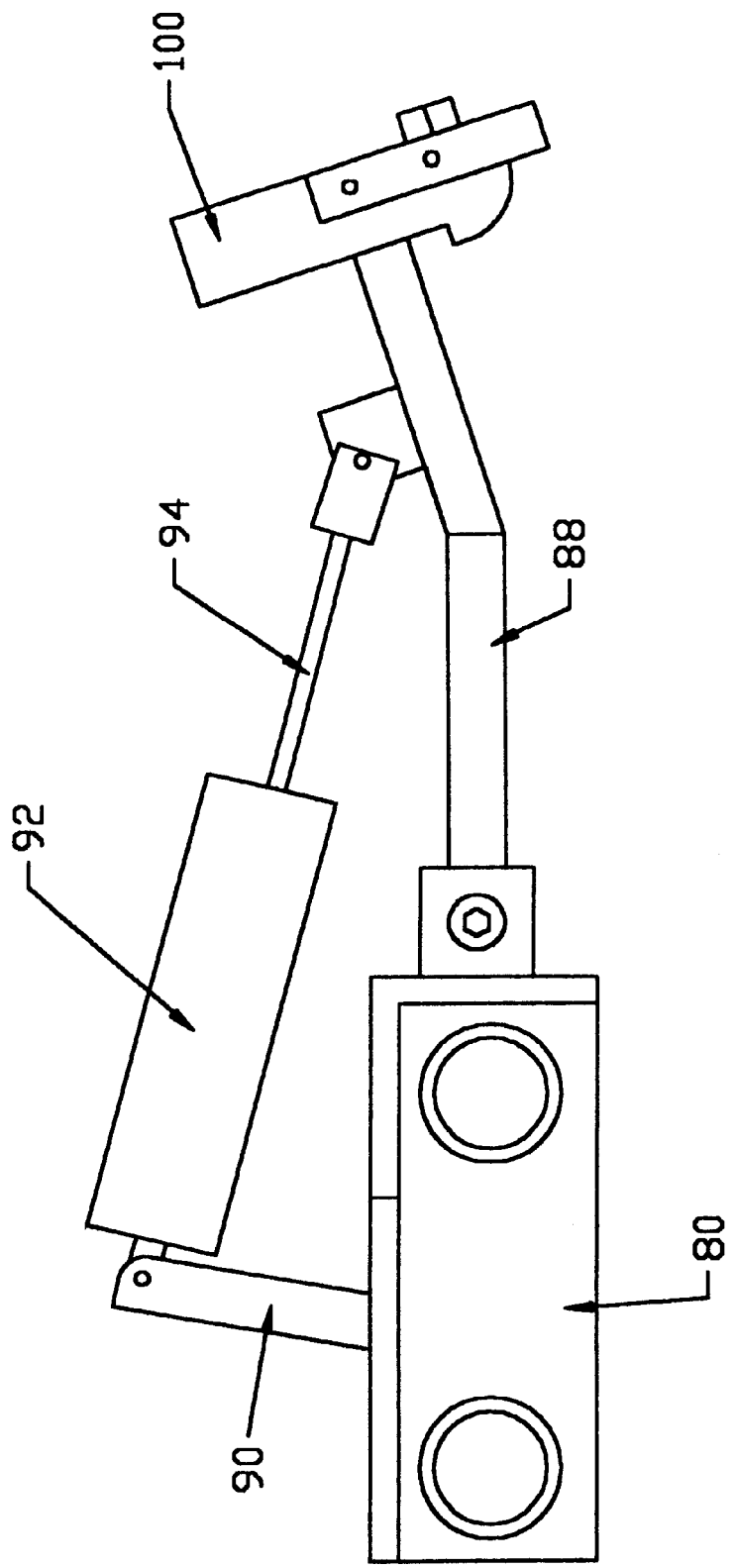
FIG. 2A is an illustration of the top view of the carriage assembly of the present invention.

Running from the first beam 16 to the underside of the top bin 12 is a shaft 60 for holding a carriage assembly 80. The shaft preferably, but not necessarily, has a round cross-section. A pillow block bearing 62 is mounted to the inside-facing surface of the first beam 16. A threaded rod 70 for movably securing the carriage assembly is rotatably coupled to the rod tray 62 and runs parallel to the shaft and perpendicular to the upwardly facing plane of the rod tray. The threaded rod 70 runs perpendicular to, and through, the underside surface of the top bin. The threaded rod 70 and the shaft 60 collectively form a double shaft linear slide for the carriage assembly 80. The threaded rod is operatively coupled to a motor (not shown), the motor being contained within the top bin 12. The motor operates to rotate the threaded rod 70 for moving the carriage assembly up or down along the threaded rod. Proximity sensors 72 and 74 are located at a the top and bottom limits of the threaded rod for stopping the rotation of the threaded rod when the carriage assembly, moving upward, nears the upper disk assembly, and stopping the rotation of the threaded rod when the carriage assembly, moving downward, reaches a desired point. In the preferred embodiment, the motor is a ½ HP inverter duty 3-phase motor, which is driven by an inverter. In the preferred embodiment, the threaded rod is coupled to the motor by an OMEGA flex element. The carriage assembly 80, shown in a preferred embodiment in FIG. 2, is both threadedly coupled to the threaded rod 70, and slidingly coupled to the shaft 60. Mounted to the carriage assembly 80 and extending inwardly, so as to be axially aligned with the threaded rod and the shaft, is a pair of inserts. Rotatably coupled to the insert is an arm assembly 82. The arm assembly contains a 90-degree rotated T-shaped section 84 having a vertical component and a horizontal component such that a vertical component 86 has vertical ends of the rotated T which are rotatably coupled to the insert. The horizontal component 88 of the rotated T-shaped section extends perpendicularly to the vertical component, and contains an approximately 15-degree counterclockwise bend at approximately the halfway point of the horizontal component. The carriage assembly 80 is preferably made of DELRIN. Extending perpendicularly from the carriage assembly 80 and mounted to the carriage assembly is a cylinder holder 90. The cylinder holder 90 is designed to hold a cutting head air cylinder 92 which extends inwardly, forming an angle of approximately 100 degrees with the cylinder holder 90. The cutting head air cylinder contains an extension rod 94 which is configured to push the horizontal component 88 of the arm assembly when extended, and to rotate the arm assembly about an axis formed by the vertical component of the arm assembly. Coupled to the end of the horizontal component 88 of the arm assembly 82 is a cutting head assembly 100. The cutting head assembly 100 is configured to swivel, rotating about an axis located approximately along the length of the cutting head air cylinder. The carriage assembly 80, cylinder holder 90, arm assembly 82, and cutting head air cylinder 92 are configured such that the extension of the rod 94 of the cutting head air cylinder 92 will operate to push the arm assembly 82, rotating the arm assembly, and therefore the cutting head assembly 100, towards the fruit to be peeled. The cutting head air cylinder 92 is operatively coupled to means for operating the cutting head air cylinder 92.

FIG. 3 is an illustration of a preferred embodiment of a cutting head assembly 100 as used in the present invention. Preferably, the cutting head assembly is constructed of a light weight plastic, such as DELRIN. The use of a light weight plastic will allow the cutting head assembly to follow the contours of the fruit while the cutting head swivels, and minimize the likelihood of the cutting head bouncing off the fruit as the fruit rotates. The cutting head assembly 100 is generally T-shaped, and positioned such that a top section 102 of the "T" can rest against the fruit when the fruit is being peeled. A curved razor blade 104 is adjustably coupled to the cutting head assembly such that the razor blade extends perpendicularly outwardly from the top section 102 of the cutting head assembly 100. The razor blade 104 may be extended or retracted to accommodate varying depths of rinds of fruit to be peeled. The adjustable coupling of the curved razor blade allows for easy adjusting of desired cutting depth to accommodate rinds of varying depth. In the preferred embodiment, a cutting depth of ⅛ to ½ is possible. The blade can be easily replaced. The razor blade 104 extends through the rind of the fruit while the top section of the cutting head assembly 102 rests against the rind, preventing the properly adjusted curved razor blade from undesirably cutting the flesh of the fruit. Because the cutting head assembly is configured to swivel, the cutting head assembly is able to follow the contours of irregularly shaped fruit. As the threaded rod rotates, moving the carriage assembly upward towards the fruit, the cutting head assembly is moved toward the fruit by the operation of the cutting head air cylinder and the arm assembly. As the cutting head assembly moves upward so that the cutting head assembly contacts the fruit, the top section of the cutting head assembly is able to maintain a tangential relation to the surface of the fruit. The cutting air cylinder acts to maintain a desired tension, allowing the cutting head assembly to swivel over the fruit with constant pressure against the fruit. This allows a consistent, yet adjustable, cutting depth along the profile of varying shapes and sizes of fruits or vegetables.

After the fruit has been peeled, and the cutting head assembly reaches the top of the fruit, near the upper disk assembly, the first proximity sensor causes the fruit to stop rotating and causes the threaded rod to stop rotating. The water sprayer then will stop spraying, and the cutting head air cylinder retracts, which causes the arm assembly to rotate away from the fruit, pulling the air cylinder correspondingly away from the fruit. The threaded rod then will automatically rotate in the opposite direction, moving the carriage assembly downward, until the second proximity sensor is actuated, stopping the rotation of the threaded rod and halting the movement of the carriage assembly. The operator will then press the treadle air valve, which retracts the rod of the lower air cylinder, causing the lower disk assembly to lower and causing the fruit to lower until it rests once again upon the ring. The operator can then remove the fruit from the ring.

This improved fruit peeler, in the preferred embodiment, is configured such that the operator can peel a fruit or vegetable by placing the fruit onto the ring, pressing the air treadle valve, pressing the starting switch, waiting for the fruit to peel, pressing the air treadle valve again, and removing the fruit from the ring. The ease of operation of this fruit peeler enables an operator to operate at least three fruit peelers at once efficiently. The peeler allows for the quick and efficient, yet adaptable, peeling of diverse fruits and vegetables. The peeler is of sturdy construction, and the parts are easily configured or replaced.

The foregoing description of a preferred embodiment of the invention has been presented for purposes of illustration and description, and is not intended to be exhaustive or to limit the invention to the precise form disclosed. The description was selected to best explain the principles of the invention and practical application of those principals to enable others skilled in the art to best utilize the invention in various embodiments and various modifications as are suited to the particular use contemplated. It is intended that the scope of the invention not be limited by the specification, but be defined by the claims set below.

I claim:

1. A peeling machine for peeling a fruit or a vegetable, comprising:
   a) a frame;
   b) an upper disk assembly, which is rotatably coupled to the frame;
   c) a lower disk assembly, which is movably coupled to the frame, the lower disk assembly being directly underneath the upper disk assembly;
   d) a first air cylinder, which is configured to extend and push the lower disk assembly against the fruit, thereby pushing the fruit against the upper disk assembly, such that the fruit is secured between the lower disk assembly and the upper disk assembly;
   e) a disk assembly rotator, for rotating the upper disk assembly;
   f) a carriage assembly, which is movably coupled to the frame;
   g) a cutting head coupled to the carriage assembly;
   h) a second air cylinder coupled to the cutting head, such that extension of the second air cylinder will move the cutting head towards the fruit; and
   i) a carriage assembly mover, for vertically moving the carriage assembly.

2. The peeling machine of claim 1, further comprising a fruit holder adjustably coupled to the frame and positioned vertically between the upper disk assembly and the lower disk assembly for holding the fruit.

3. The peeling machine of claim 2, further comprising a threaded rod rotatably coupled to the frame, the carriage assembly being threadedly coupled to the threaded rod, and such that the carriage assembly mover is configured to rotate the threaded rod and thereby move the carriage assembly vertically along the threaded rod.

4. The peeling machine of claim 3, further comprising a shaft coupled to the frame and parallel to the threaded rod, the carriage assembly being slidingly coupled to the shaft.

5. A peeling machine for peeling a fruit or a vegetable, the apparatus comprising:
   a) a frame;
   b) a fruit rotator, the fruit rotator being coupled to the frame, the fruit rotator comprising: an upper disk assembly and a lower disk assembly for securing the fruit; a first air cylinder which is configured to push the lower disk assembly towards the upper disk assembly; and a disk assembly rotator for rotating the upper disk assembly;
   c) a carriage assembly, the carriage assembly being movably coupled to the frame;
   d) a second air cylinder coupled to the carriage assembly;
   e) a cutter, the cutter being movably coupled to the carriage assembly and coupled to the second air cylinder, such that the extension of the second air cylinder will move the cutter toward the fruit; and
   f) a carriage assembly mover, which is configured to move the carriage assembly vertically.

* * * * *